United States Patent [19]
Chance

[11] Patent Number: 5,110,242
[45] Date of Patent: May 5, 1992

[54] APPARATUS FOR STORING AUTOMOBILES INSIDE MARITIME CONTAINERS

[76] Inventor: Martin D. Chance, P.O. Box 28, Ramsey, Isle of Man

[21] Appl. No.: 613,849
[22] PCT Filed: Apr. 4, 1989
[86] PCT No.: PCT/US89/01380
  § 371 Date: Jan. 22, 1991
  § 102(e) Date: Jan. 22, 1991
[51] Int. Cl.⁵ ............................... B60P 3/08
[52] U.S. Cl. .................... 410/26; 220/1.5; 410/12; 414/228
[58] Field of Search ......... 414/227, 228, 233, 234, 414/235, 495, 498, 537, 608; 410/4, 9, 14, 24, 26, 28.1, 29.1, 12, 27; 220/1.5

[56] References Cited

U.S. PATENT DOCUMENTS

| | | | |
|---|---|---|---|
| 1,229,714 | 6/1917 | Clark et al. | 410/14 X |
| 1,247,553 | 11/1917 | Linquist et al. | 410/14 |
| 1,693,184 | 11/1928 | Rumely | 410/9 |
| 2,009,149 | 7/1935 | Pierce | 410/28.1 X |
| 2,386,836 | 10/1945 | Blagden | 410/21 |
| 2,611,640 | 9/1952 | Francis | 410/28.1 |
| 3,498,480 | 3/1970 | Gutridge | 414/398 |
| 3,675,795 | 7/1972 | Dluhy. | |
| 3,797,410 | 3/1974 | Blunden | 414/398 X |
| 3,841,235 | 10/1974 | Wheeler et al. | 410/12 |
| 3,880,457 | 4/1975 | Jones, Jr. | 410/28.1 X |
| 3,994,523 | 11/1976 | Harold | 410/28.1 X |
| 4,044,691 | 8/1977 | Kigus, deceased et al. | 410/12 |
| 4,316,686 | 2/1982 | Cottrell et al. | 410/12 |
| 4,343,401 | 8/1982 | Paulyson | 410/26 X |
| 4,668,141 | 5/1987 | Petersen | 410/13 X |
| 4,668,142 | 5/1987 | Fity et al. | 410/29.1 |
| 4,768,916 | 9/1988 | Gearin et al. | 414/498 |
| 4,797,049 | 1/1989 | Gearin et al. | 414/498 |
| 4,801,229 | 1/1989 | Hanada et al. | 410/26 |
| 4,881,859 | 11/1989 | Ehrlich | 410/29.1 X |
| 4,963,067 | 10/1990 | Gearin et al. | 414/399 X |
| 4,992,013 | 2/1991 | Westerdale | 410/26 |

FOREIGN PATENT DOCUMENTS

| | | | |
|---|---|---|---|
| 1284610 | 12/1966 | Fed. Rep. of Germany | 414/227 |
| 1254559 | 1/1961 | France | 410/4 |

OTHER PUBLICATIONS
Buck Ramps-Buck Equipment Corp.-Oct. 1963.

Primary Examiner—Robert J. Spar
Assistant Examiner—Robert S. Katz
Attorney, Agent, or Firm—Sanchelima & Assoc.

[57] ABSTRACT

An apparatus for storing four vehicles inside a maritime container using a platform (20) with locking mechanisms (40) for suspending it at a pre-determined distance from the floor of the container. Jack assemblies (60) are used to lower or raise the platform depending on the characteristics of the vehicle being loaded. Leaking fluid pans (32) are cooperatively and removably mounted to the platform (20) in order to prevent any damage to the vehicles on the lower level. The platform assembly (20) extends the entire span of the container where it is housed with the two parallel structural lateral members (24 and 24') kept in a spaced apart relationship by girder members (25) and spacer members (26). The vehicles are tied down during transportation to minimize movement.

21 Claims, 3 Drawing Sheets

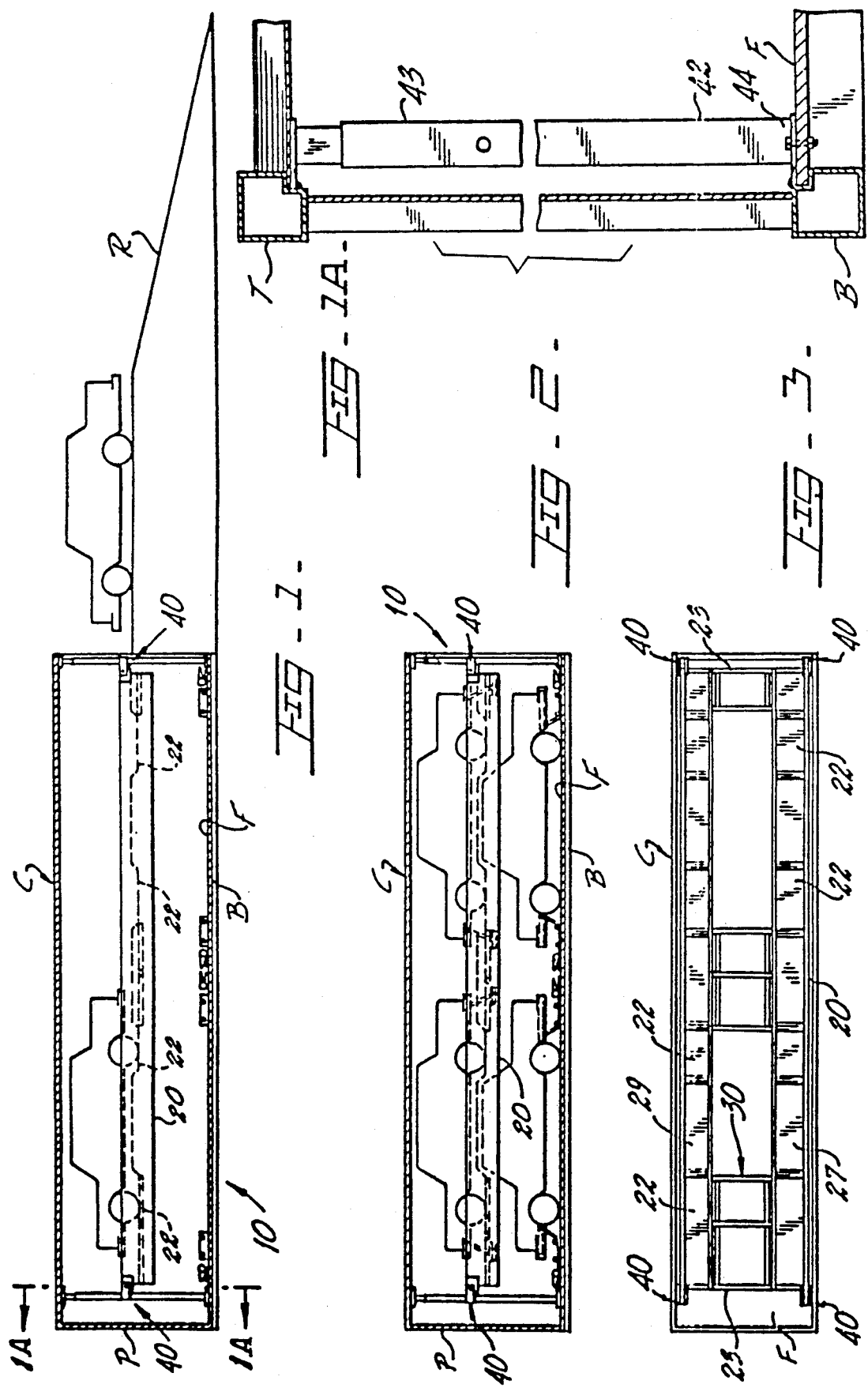

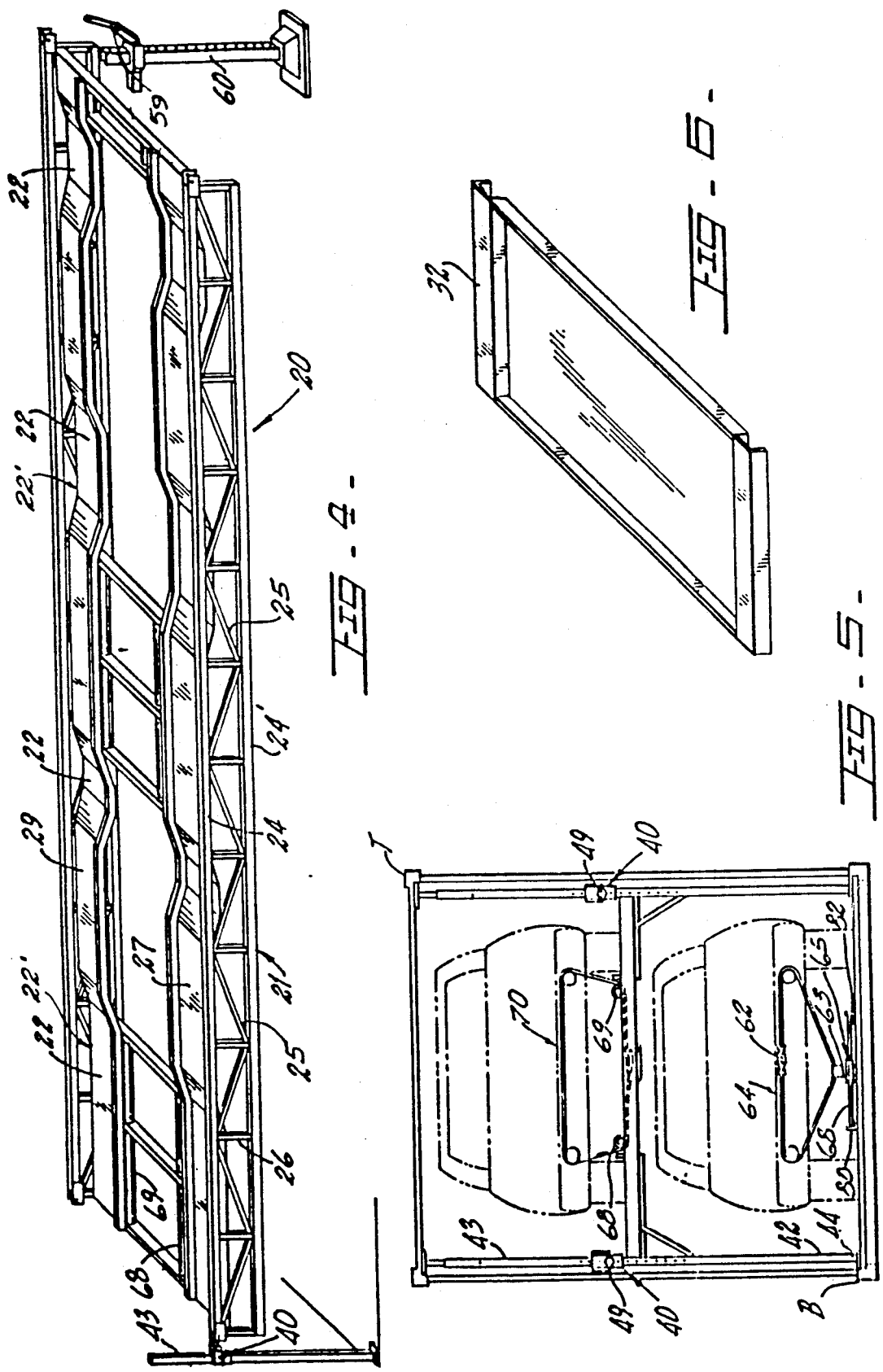

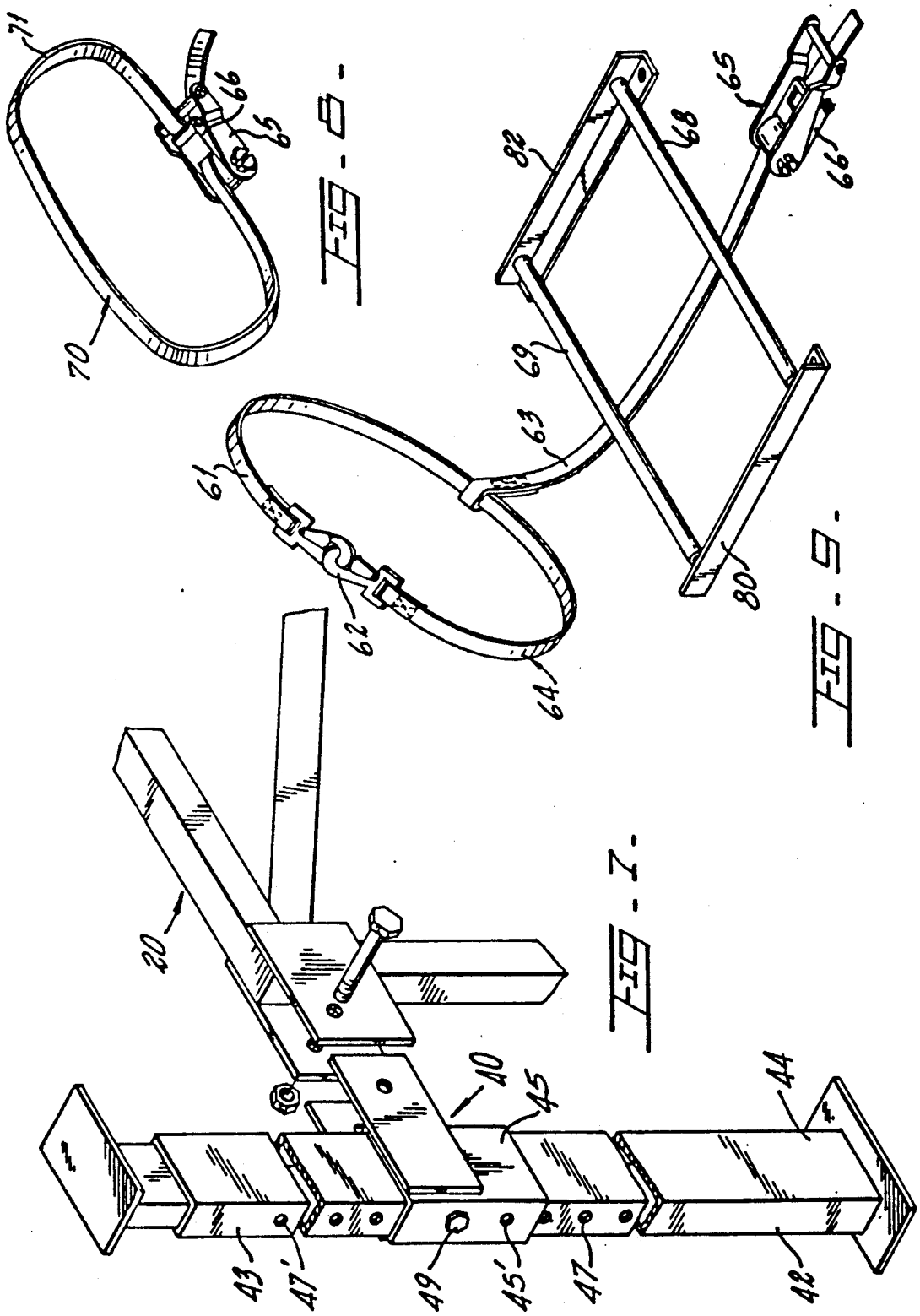

5,110,242

APPARATUS FOR STORING AUTOMOBILES INSIDE MARITIME CONTAINERS

TECHNICAL FIELD

The present invention relates to an apparatus for storing vehicles inside maritime containers.

BACKGROUND ART

Several devices have been designed in the past to fit as many vehicles as possible inside maritime containers. The dimensions of these containers are limited by the regulations in many countries where there are minimum clearance laws for bridges and overpasses. These containers are typically loaded on trucks that are required to meet these regulations if the national highways are going to be used.

The closest reference is U.S. Pat. No. 3,675,795 issued to Herbert Dluky in 1972. However, that invention can only store three vehicles inside a container with angled ramps.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide an apparatus to be used in conjunction with maritime containers for the volumetrically efficient storage and transportation of vehicles and other commodities.

It is another object of this invention to provide an apparatus capable of securely double stacking vehicles within a maritime container.

It is yet another object of this present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a side elevational view of the present invention showing two vehicles being loaded in a maritime container with the lateral wall of the container removed.

FIG. 1a illustrates a partial cross-sectional view taken along line 1a—1a in FIG. 1.

FIG. 2 shows the representation of FIG. 1 with four vehicles inside a maritime container and the vehicles are tied down.

FIG. 3 illustrates a top view of the container incorporating the present invention with the top wall of the container removed.

FIG. 4 is a representation in perspective of an embodiment of the platform in accordance with the present invention.

FIG. 5 is an end view of this invention showing two manners for tying down the vehicles.

FIG. 6 is a fluids collection pan removably mountable to the platform shown in FIG. 4.

FIG. 7 shows the slidable sleeve and elongated member of the locking mechanism as it attaches to one of the corners of the platform.

FIG. 8 shows the strap used for the vehicles stored at the top.

FIG. 9 shows a preferred embodiment of the mechanism used to tie down the vehicles to the floor.

DETAILED DESCRIPTION OF THE PREFERRED EMBODIMENT

Referring now to FIG. 1 and 2, where the present invention is generally referred to with numeral 10, it can be observed that it basically includes platform member 20 that extends throughout substantially the entire length of container C and it is housed therein.

Conveniently, containers C as referred, in the present application, are 12 m. or 40 ft. long, 2.896 m. or 9½ feet high and 2.3 m. or 96 inches wide, which are amongst the largest populations of maritime containers in use at the present time. All containers C have a floor F, four bottom frame members B, four top frame members T and four corner posts P. Most of them have side walls and roofs. The floor F of containers C is rigidly secured to bottom frame members B. Preferably, platform 20 includes four corners, two long lateral sides 21 and two short end sides 23. Eight depression areas 22' including bottom surfaces 22, intended for supporting the wheels of the vehicle, are cooperatively positioned on platform 20 to receive them. It can be seen from FIG. 3 that platform 20 includes ramp ways 27 and 29. Ramp way 27 is wider than ramp way 29 and that is so that a driver can open the door of the vehicle to get in and out when the vehicle is parked with the left wheels at the innermost position ramp way 27.

As seen in FIG. 3, a locking mechanism 40 is mounted on each one of the corners providing the means for moving platform assembly 20 up or down, as required, and maintaining it at a leveled horizontal orientation. An area 30 on platform 20 is designed for removably mounting an oil leak collecting pan 32 since not infrequently the vehicles transported leak fluids that could damage the vehicles stored below.

Platform 20 includes, in the preferred embodiment shown in FIG. 4, two elongated structural members 24 and 24' on each of the long lateral sides 21 providing the necessary structural support for the platform to extend the entire span of the container which is typically 40 feet. Longer or shorter containers C can also be accommodated with the teachings of the present invention. For example, a 6 meter container would use half of platform 20. Girder members 25 and spacers 26 are positioned between member 24 and 24' to further strengthen platform 20 in a manner similar to what is done with bridges.

Locking mechanism 40 are located preferably one each one of the corners and are capable of being released so that removable jack assemblies 60 can be used to temporarily support platform 20 with or without vehicles thereon. Removable jack assemblies 60 include a mechanical crank 59 in the preferred embodiment. Locking mechanisms 40, as seen in FIG. 5, are rigidly mounted to the floor and roof of container C. In the preferred embodiment, locking mechanisms 40 include an elongated member 42 that has an upper end 43 rigidly mounted to the roof of container C and lower end 44 rigidly mounted to the floor of container C. Sleeve member 45 coaxially slides over member 42 and is provided with several through holes 46, as seen in FIG. 8. A cooperating opening 47 in member 42 receives pin 49 after going through hole 45' member 45 thereby keeping member 45 locked in place with respect to member 42. Openings 47 through member 42 are positioned preferably around the middle (usually about 10 or 12) and one opening 47 at the top portion of member 42 so that platform 20 can be raised all the way up.

In operation, platform 20 is lowered to the vehicle loading position to allow the first two vehicles to be loaded to go on platform 20, as best seen in FIG. 1. As these vehicles enter container C from ramp R, they will be parked on depressions 21' including wheel supporting bottom surface 22 causing them to sink about 7.5 cm., or 3 inches, approximately. Then, the cars are tied down with strap 70 so that the vehicles' height is lowered approximately another 7.5 cm., or 3 inches, as shown in FIG. 5. This tying down of the vehicles also prevents any bouncing or vertical movement during transportation that could damage them as it can be seen in FIG. 8, strap 70 forms a loop 71 and it is ratcheted by ratchet mechanism 65 to reduce its size thereby securing the upper vehicle's impact absorbing members to rollers 68 and 69. Roller 68 and 69 are rotably mounted to brackets 80 and 82, as shown in FIG. 9. The suspension of the vehicles is kept in the compression state during transportation. Next, platform 20 is raised so that the vehicles to be loaded on the floor are allowed in. Then the lower vehicles are also tied down with strap 70 that is preferably made out of 4 ton breaking strain nylon. Strap 70 is used for the lower vehicles and forms a loop 61 with buckle member 62 and another strap member 63 is tied to loop 61. Strap member 63 is ratched up under rollers 68 and 69 which are used to divert the pulling force of the straps to apply a substantially vertical downwardly force to the underside of the lower vehicles. Ratchet mechanism 65 is preferably bolted down to the flow of container C through plate 66. Then, platform 20 is lowered so that there is sufficient clearance between the roof of the upper vehicles and the inner roof of container C.

It is also possible to transport less than four vehicles leaving the rest of the space available for the storage and transportation of other goods. Platform 20 can be raised and lowered as required and it can also be dropped on the floor to provide the maximum available volume.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

INDUSTRIAL APPLICABILITY

It is apparent from the previous paragraphs that an improvement of the type for such an apparatus is quite desirable to be used in conjunction with maritime containers for the volumetrically efficient storage and transportation of vehicles.

What is claimed is:

1. An apparatus for double stacking wheeled vehicles in upper and lower levels inside a maritime container with a substantially rectangular floor plan having a floor, four top frame members, four bottom frame members and four corner posts, and said apparatus further including a removable ramp assembly, comprising:

A. a continuous and rigid platform member having four corners extending substantially the entire length and width of said container and housed therein, said platform member having two long lateral sides and two short end sides and said platform member further including two parallel ramp ways that are kept in a spaced apart relationship that cooperatively receive said wheeled vehicles;

B. locking means for keeping said platform member suspended in a substantially horizontal plane above said floor and in cooperation with said ramp assembly for loading the vehicles on said upper level and said locking means including means for adjusting the separation of said platform member from said roof and said locking means being positioned at said corners of said platform member; and C. mechanical crank jack members removably mounted to said platform member so that said platform member can be vertically raised and lowered.

2. The apparatus set forth in claim 1 wherein said locking means includes one elongated member positioned adjacent to each of said platform corners and rigidly mounted to said floor and to said top and bottom frame members and further including a sleeve member slidably mounted over said elongated member and including means for keeping said sleeves and elongated member locked with respect to each other.

3. The apparatus set forth in claim 2 wherein said means for keeping said sleeve member locked in place includes a plurality of through holes and said elongated member includes at least one cooperating opening, and a pin member removably inserted therethrough.

4. The apparatus set forth in claim 3 wherein said platform member includes a plurality of depressed areas for receiving the wheels of said stacked vehicles.

5. The apparatus set forth in claim 4 wherein said depressed areas have sufficient depth to lower two of said vehicles supported by said platform member so that two additional vehicles fit underneath in cooperative alignment of the wheels of the upper vehicles with the front and rear areas of said vehicles.

6. The apparatus set forth in claim 5 wherein said platform member includes a plurality of oil collection means cooperatively positioned on said platform member for receiving leaking fluids from said vehicles.

7. The apparatus set forth in claim 6 wherein said platform member includes two lateral elongated structural members parallel to each other and reinforced with girder members.

8. The apparatus set forth in claim 7 wherein one of said ramp ways is wider than the other one thereby defining a walkway.

9. The apparatus set forth in claim 1 wherein said vehicles include suspension means and said apparatus further including:

D. means for tying down said vehicles to said platform member and to said floor so that their height is decreased by keeping said suspension means in compression state.

10. The apparatus set forth in claim 9 wherein said platform member includes a plurality of depressed areas for receiving the wheels of said stacked vehicles.

11. The apparatus set forth in claim 10 wherein said depressed areas have sufficient depth to lower two of said vehicles supported by said platform member so that the vehicles on said lower level fit underneath in cooperative alignment of the wheels of the upper vehicles with the front and rear of said lower level vehicles.

12. The apparatus set forth in claim 11 wherein said platform member includes a plurality of oil collection means cooperatively positioned on said platform member for receiving leaking fluids from said vehicles.

13. The apparatus set forth in claim 12 wherein said platform member includes two lateral elongated structural members parallel to each other and reinforced with girder members.

14. The apparatus set forth in claim 13 wherein one of said ramp ways is wider than the other one thereby defining a walkway.

15. An apparatus for double stacking wheeled vehicles in upper and lower levels inside a maritime container with a substantially rectangular floor plan having a floor, four top frame members, four bottom frame members and four corner posts, and said apparatus further including a removable ramp assembly, comprising:
- A. a continuous and rigid platform member having four corners extending, substantially the entire length and width of said container and housed therein, said platform member having two long lateral sides and two short end sides and said platform member further including two parallel ramp ways that are kept in a spaced apart relationship that cooperatively receive said wheeled vehicles;
- B. locking means for keeping said platform member suspended in a substantially horizontal plane above said floor and in cooperation with said ramp assembly for loading the vehicles on said upper level and said locking means including means for adjusting the separation of said platform member from said roof and said locking means being positioned at said short end sides of said platform member; and
- C. a mechanical crank jack member removably mounted to said platform member so that said platform member can be vertically raised and lowered.

16. The apparatus set forth in claim 15 wherein said vehicles include suspension means and said apparatus further including:
- D. means for tying down said vehicles to said platform member and to said floor so that their height is decreased by keeping said suspension means in compression state.

17. The apparatus set forth in claim 16 wherein said platform member includes a plurality of depressed areas having a supporting bottom surface for receiving the wheels of said stacked vehicles.

18. The apparatus set forth in claim 17 wherein said depressed areas have sufficient depth to lower two of said vehicles supported by said platform member so that two additional vehicles fit underneath in cooperative alignment of the wheels of the upper vehicles with the front and rear areas of said vehicles.

19. The apparatus set forth in claim 18 wherein said platform member includes a plurality of oil collection means cooperatively positioned on said platform member for receiving leaking fluids from said vehicles.

20. The apparatus set forth in claim 19 wherein said platform member includes two lateral elongated structural members parallel to each other and reinforced with girder members.

21. The apparatus set forth in claim 20 wherein one of said ramp ways is narrower than the other one thereby defining a walkway between said wider ramp way and the closest longer side of said rectangular floor plan.

* * * * *